(12) United States Patent
Czarnik et al.

(10) Patent No.: US 11,492,924 B1
(45) Date of Patent: Nov. 8, 2022

(54) EMBEDDED ELECTRIC MACHINE COOLING

(71) Applicants: General Electric Company, Schenectady, NY (US); General Electric Company Polska sp. z o.o., Warsaw (PL)

(72) Inventors: Miroslaw Czarnik, Warsaw (PL); Adam Tomasz Pazinski, Warsaw (PL); Pawel Zdrojewski, Warsaw (PL); Christopher N. Delametter, Mechanicville, NY (US); Lukasz Maciej Janczak, Warsaw (PL); Maciej Krzysztof Grunwald, Warsaw (PL); Scott Alan Schimmels, Miamisburg, OH (US)

(73) Assignees: GENERAL ELECTRIC COMPANY POLSKA SP. Z O.O, Warsaw (PL); GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/381,677

(22) Filed: Jul. 21, 2021

(51) Int. Cl.
| | |
|---|---|
| *F01D 25/12* | (2006.01) |
| *F01D 15/10* | (2006.01) |
| *F02C 6/08* | (2006.01) |
| *H02K 7/18* | (2006.01) |

(52) U.S. Cl.
CPC ............ *F01D 25/12* (2013.01); *F01D 15/10* (2013.01); *F02C 6/08* (2013.01); *H02K 7/1823* (2013.01); *F05D 2220/76* (2013.01); *F05D 2260/201* (2013.01); *F05D 2260/232* (2013.01); *H02K 2209/00* (2013.01)

(58) Field of Classification Search
None
See application file for complete search history.

(56) References Cited

U.S. PATENT DOCUMENTS

| | | | |
|---|---|---|---|
| 5,211,005 A * | 5/1993 | Hovnanian | F02C 7/222 60/800 |
| 5,655,359 A | 8/1997 | Campbell et al. | |
| 6,185,925 B1 * | 2/2001 | Proctor | F01D 11/24 415/177 |
| 6,256,990 B1 * | 7/2001 | Itoh | F01D 9/026 60/323 |

(Continued)

OTHER PUBLICATIONS

Kirk et al., Analysis of Rotordynamic Forces for High Inlet Pre-Swirl Rate Labyrinth Seals, 10th International Conference on Vibrations in Rotating Machinery, ScienceDirect, 2012 https://www.sciencedirect.com/topics/materials-science/labyrinth-seal.

*Primary Examiner* — Michael Lebentritt
(74) *Attorney, Agent, or Firm* — Dority & Manning. P.A.

(57) ABSTRACT

In one exemplary embodiment, a gas turbine engine is provided. The gas turbine engine defines a radial direction, an axial direction, and an axis extending along the axial direction of the gas. The gas turbine engine includes: a shaft configured to rotate about the axis; an electric machine comprising a rotor coupled to and rotatable with the shaft and a stator, the rotor defining an end along the axial direction; and a cooling manifold rotatable with the rotor and positioned at the end of the rotor, the cooling manifold configured to receive a flow of cooling fluid and provide the cooling fluid to the stator during operation of the gas turbine engine.

20 Claims, 6 Drawing Sheets

(56) References Cited

U.S. PATENT DOCUMENTS

| | | | |
|---|---|---|---|
| 7,254,937 B2 * | 8/2007 | Hull | F02C 7/08 |
| | | | 60/39.511 |
| 7,970,497 B2 | 6/2011 | Derouineau et al. | |
| 8,890,343 B2 | 11/2014 | Bulin et al. | |
| 9,097,134 B2 | 8/2015 | Ferch et al. | |
| 9,664,114 B2 * | 5/2017 | Coffin | B64D 27/26 |
| 9,917,490 B2 | 3/2018 | Lemmers et al. | |
| 10,308,366 B2 | 6/2019 | Kupiszewski et al. | |
| 10,487,839 B2 | 11/2019 | Kupiszewski et al. | |
| 10,801,410 B2 | 10/2020 | Roberge | |
| 10,910,916 B2 | 2/2021 | Jassal et al. | |
| 11,242,156 B2 | 2/2022 | Spierling | |
| 2003/0038553 A1 | 2/2003 | Andres et al. | |
| 2009/0232676 A1 * | 9/2009 | Mowill | F01D 5/043 |
| | | | 415/203 |
| 2010/0126016 A1 * | 5/2010 | An | F02B 37/013 |
| | | | 29/889.2 |
| 2011/0076166 A1 * | 3/2011 | Godeke | F03B 17/061 |
| | | | 417/410.1 |
| 2013/0004297 A1 * | 1/2013 | Sheridan | F02K 3/04 |
| | | | 415/122.1 |
| 2013/0283758 A1 * | 10/2013 | Wotzak | F16C 35/073 |
| | | | 60/39.08 |
| 2015/0292408 A1 * | 10/2015 | Suciu | B01D 46/62 |
| | | | 55/482 |
| 2016/0003086 A1 * | 1/2016 | Day | F01D 11/24 |
| | | | 415/136 |
| 2018/0313276 A1 * | 11/2018 | Taylor | F02K 3/02 |
| 2020/0165935 A1 | 5/2020 | Hashimoto et al. | |
| 2020/0208533 A1 * | 7/2020 | Kapadia | F02C 9/18 |
| 2020/0378333 A1 * | 12/2020 | Wicks | F02F 1/40 |

\* cited by examiner

EMBEDDED ELECTRIC MACHINE COOLING

RELATED APPLICATIONS

The present application claims priority to Polish Patent Application No. P.437703 filed Apr. 26, 2021.

FIELD

This application is generally directed to a cooling assembly for an embedded electric machine withing a gas turbine engine.

BACKGROUND

Electric machines generate heat during operation. Accordingly, even when mounted in a cold section of an aircraft engine, it may be necessary to provide cooling to the electric machine. A system and method for cooling an electric machine would be useful.

BRIEF DESCRIPTION

Aspects and advantages of the invention will be set forth in part in the following description, or may be obvious from the description, or may be learned through practice of the invention.

In one exemplary embodiment, a gas turbine engine is provided. The gas turbine engine defines a radial direction, an axial direction, and an axis extending along the axial direction of the gas. The gas turbine engine includes: a shaft configured to rotate about the axis; an electric machine comprising a rotor coupled to and rotatable with the shaft and a stator, the rotor defining an end along the axial direction; and a cooling manifold rotatable with the rotor and positioned at the end of the rotor, the cooling manifold configured to receive a flow of cooling fluid and provide the cooling fluid to the stator during operation of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
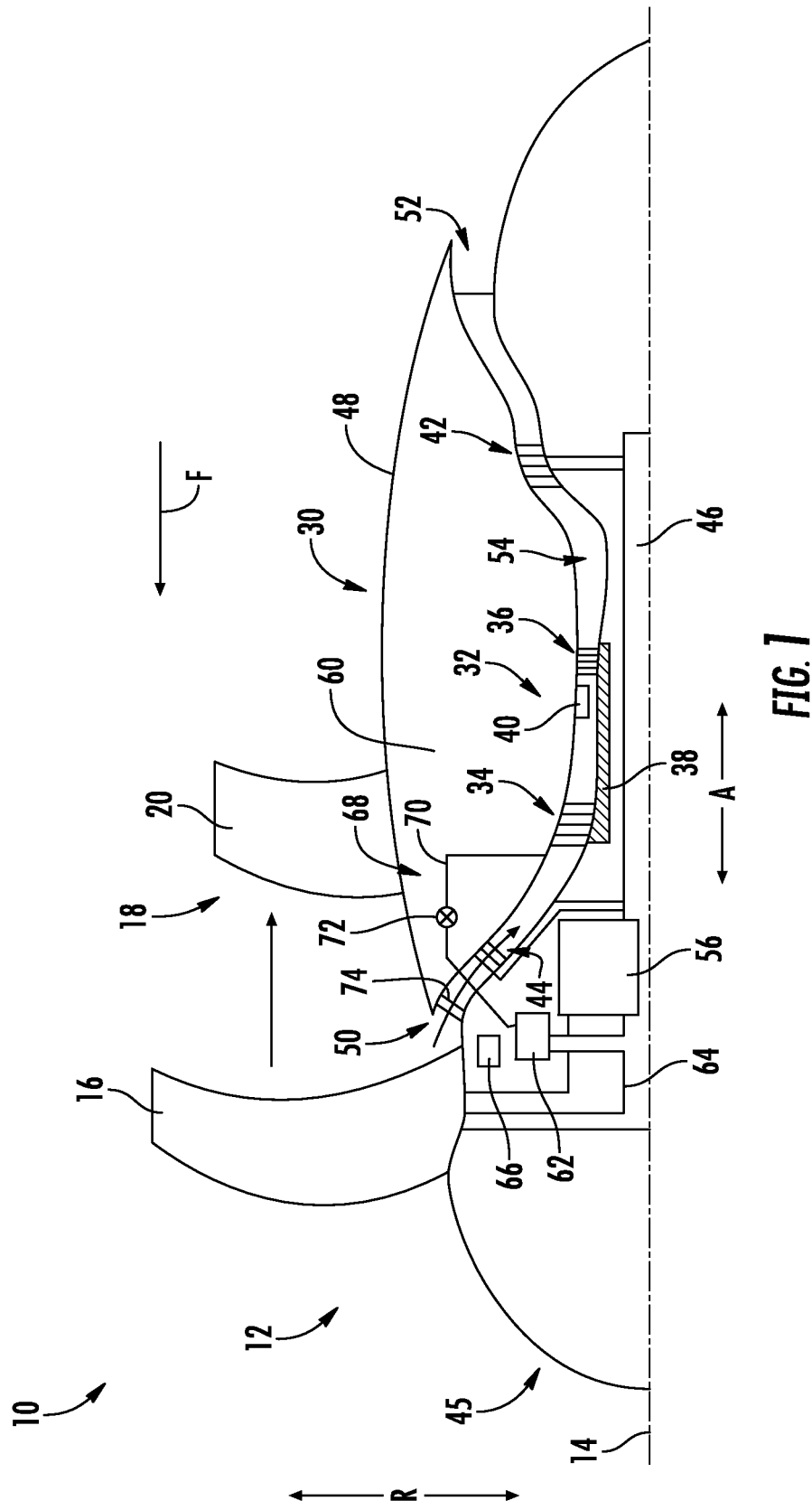
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the Drawings, FIG. 1 shows an elevational cross-sectional view of an exemplary embodiment of a gas turbine engine as may incorporate one or more inventive aspects of the present disclosure. In particular, the exemplary gas turbine engine of FIG. 1 is a configured as a single unducted rotor engine 10 defining an axial direction A, a radial direction R, and a circumferential direction C (extending about the axial direction A). As is seen from FIG. 1, engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10. Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14. The rotor blades 16 may be arranged in typically equally spaced relation around the centerline 14. The rotor assembly 12 further includes a hub 45 located forward of the plurality of rotor blades 16.

Referring still to FIG. 1, the vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located at a forward end of the engine 10 in a "puller" configuration.

Additionally, the engine 10 includes a turbomachine 30 having a core (or high speed system) 32 and a low speed system. The core 32 generally includes a high-speed compressor 34, a high speed turbine 36, and a high speed shaft 38 extending therebetween and connecting the high speed compressor 34 and high speed turbine 36. The high speed compressor 34, the high speed turbine 36, and the high speed shaft 38 may collectively be referred to as a high speed spool of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool.

The low speed system similarly includes a low speed turbine 42, a low speed compressor or booster, 44, and a low speed shaft 46 extending between and connecting the low speed compressor 44 and low speed turbine 42. The low speed compressor 44, the low speed turbine 42, and the low speed shaft 46 may collectively be referred to as a low speed spool of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 20 along the radial direction R.

However, in other embodiments, the inlet 50 may be positioned at any other suitable location, e.g., aft of the vane assembly 18, arranged in a non-axisymmetric manner, etc.

As is depicted, the rotor assembly 12 is driven by the turbomachine 30, and more specifically, is driven by the low speed shaft 46. More specifically, still, for the exemplary embodiment of the engine 10 depicted in FIG. 1, the engine 10 includes a power gearbox 56, and the rotor assembly 12 is driven by the low speed shaft 46 of the turbomachine 30 across the power gearbox 56. In such a manner, the rotating rotor blades 16 of the rotor assembly 12 may rotate around the axis 14 and generate thrust to propel engine 10, and hence an aircraft to which it is associated, in a forward direction F.

The power gearbox 56 may include a gearset for decreasing a rotational speed of the low speed shaft 46 relative to the low speed turbine 42, such that the rotor assembly 12 may rotate at a slower rotational speed than the low speed shaft 46.

Further, for the embodiment shown, the engine 10 includes an electric machine 62 coupled to a shaft of the engine rotatable about the longitudinal axis 14 of the engine 10, and located inward of the engine flowpath 54 along the radial direction R, and inward of an airflow through the rotor blades 16 of the rotor assembly 12 along the radial direction R. More specifically, for the embodiment shown, it will be appreciated that the engine 10 includes a rotor shaft 64 extending from the gearbox 56 to the plurality of rotor blades 16 of the rotor assembly 12 for driving the plurality of rotor blades 16 of the rotor assembly 12. The electric machine 62, for the embodiment shown, is coupled to and rotatable with the rotor shaft 64.

As will be described in more detail below, the engine 10 includes a cooling system for maintaining a temperature of the electric machine 62 within prescribed temperature limits. The cooling system generally includes a liquid cooling system 66 in thermal communication with the electric machine 62 for cooling the electric machine 62 as well as a cooling air system 68. The cooling air system 68 may receive an airflow from engine flowpath 54 at a location downstream of the inlet 50 through one or more ducts 70 and valves 72. An inlet of the ducts 70 may include features to guide a flow through the ducts 70 (e.g., one or more louvers, scoops, slots, etc.) based on, for example, an amount of cooling flow needed, an amount of turning a pressure recovery desired (e.g., to ensure the cooling air system 68 is properly pressurized), etc. The ducts 70 may also extend through the engine flowpath 54 at a location downstream of an inlet guide vane 74 of the engine 10 and upstream of the low speed compressor 44 to the electric machine 62. However, in other embodiments, the ducts 70 of the cooling air system 68 may extend through the engine flowpath 54 at any other suitable location, or any other suitable form of cooling airflow may be provided to the electric machine 62.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc. Additionally, although the engine 10 is depicted as a single unducted rotor engine 10, in other embodiments, the engine 10 may further include a nacelle or duct enclosing at least a portion of the rotor assembly 12, the turbomachine, or both. In such a configuration, the outlet guide vanes may connect to the nacelle, and the nacelle and turbomachine may together define a bypass passage. Additionally, or alternatively, still, although the engine 10 is depicted as a geared engine 10 (i.e., including a gearbox between the low speed shaft 46 and rotor assembly 12), in other embodiments, aspects of the present disclosure may additionally or alternatively be applied to a direct drive engine where the low speed shaft 46 and a rotor shaft 64 of the rotor assembly are connected or unified such that the low speed shaft 46 rotates at the same speed as the rotor assembly 12.

Further, still, although the engine 10 is depicted having a rotor assembly having a single stage of rotor blades, in other embodiments, the engine 10 may include a multi-stage rotor configuration (open or enclosed by a nacelle), and aspects of the disclosure described hereinbelow may be incorporated therein.

Further, still, in other exemplary embodiments, any other suitable gas turbine engine 10 may be provided. For example, in other exemplary embodiments, the gas turbine engine 10 may be a ducted turbofan engine 10, a turboshaft engine, a turboprop engine, turbojet engine, etc.

Figure 2:
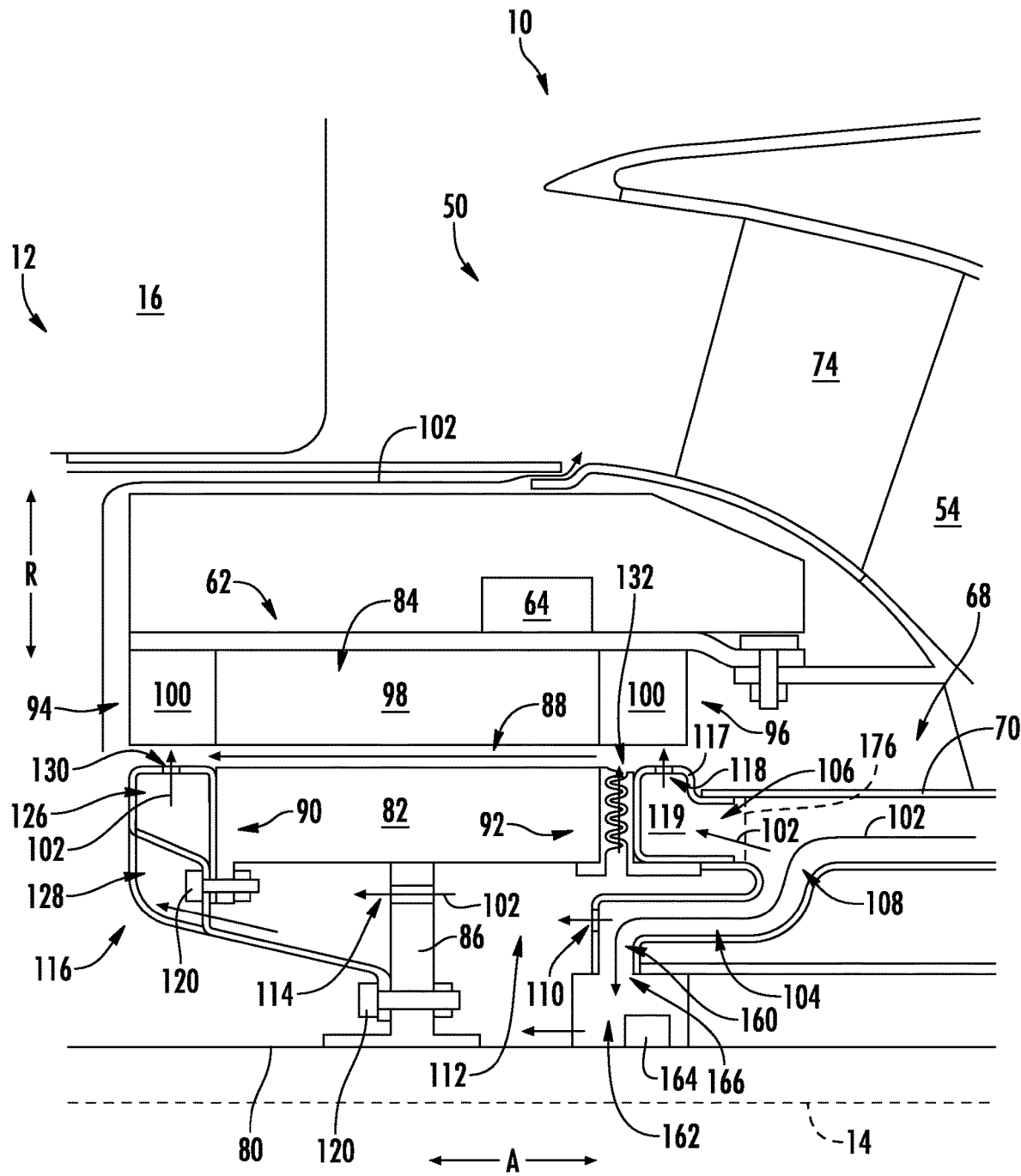
FIG. 2 is a close-up, schematic, cross-sectional view of an electric machine in accordance with an exemplary aspect of the present disclosure.

Referring now to FIG. 2, a close-up, schematic view is depicted of an electric machine 62 coupled to and rotatable with an engine shaft 80 of an engine 10 rotatable about an axis 14 of the engine 10. In at least certain exemplary embodiments, the electric machine 62 and engine 10 depicted in FIG. 2 may be configured in a similar manner as the exemplary electric machine 62 in engine 10 described above with reference to FIG. 1, and thus the same or similar reference numerals may refer to the same or similar parts. In such a manner, it will be appreciated that in at least certain exemplary embodiments, the engine shaft 80 depicted in FIG. 2 may be the exemplary rotor shaft 64 of the engine 10 of FIG. 1 configured to rotate the plurality of rotor blades 16 of the rotor assembly 12 about the axis 14.

However, in other embodiments, aspects of the present disclosure may be applied to other electric machine 62 mounting locations and/or engine configurations, such that the engine shaft 80 may be any other suitable engine shaft (such as a low pressure shaft, a high pressure shaft, etc.).

For the embodiment shown, the electric machine 62 generally includes a rotor 82 coupled to and rotatable with the engine shaft 80 and a stator 84. More specifically, for the embodiment shown, the rotor 82 is coupled to and rotatable with the engine shaft 80 through a rotor mount 86. The rotor mount 86 extends, for the embodiment shown, from the engine shaft 80 to the rotor 82 to couple the rotor 82 of the electric machine 62 to the engine shaft 80.

The electric machine 62 is generally configured as a radial flux electric machine, defining an air gap 88 between the rotor 82 and the stator 84 extending generally along an axial direction A of the engine 10. And further, for the embodiment shown, the electric machine 62 is configured as an "in-runner" electric machine 62, such that the rotor 82 is located inward of the stator 84 along a radial direction R of the engine 10. Notably, however, in other embodiments, the electric machine 62 may have other suitable configurations. For example, in other embodiments, the electric machine 62 may instead be oriented such that the air gap 88 defines an angle with respect to the axial direction A of the engine 10.

As is shown, with embodiment depicted, the rotor 82 extends generally along the axial direction A defining a first end 90 and a second end 92 along the axial direction A. Similarly, the stator 84 extends generally along the axial direction A defining a first end 94 and a second end 96 on the axial direction A. More specifically, the stator 84 includes a core 98 and a plurality of windings 100, and for the embodiment shown, the plurality of windings 100 include portions at the first end 94 and the second end 96 of the stator 84. It will be appreciated, however, that in other exemplary aspects, any other suitable stator configuration may be provided, such that the first and second ends 96 of the stator include any other suitable features.

As with the embodiment described above with reference to FIG. 1, the exemplary engine 10 depicted in FIG. 2 includes a cooling system for maintaining a temperature of the electric machine 62 within prescribed limits. The cooling system includes a liquid cooling system 64 thermally coupled to the electric machine 62 and a cooling air system 68. The liquid cooling system 64 may more specifically be operable with the stator 84 to reduce a temperature of certain aspects of the stator 84.

However, it may be difficult for the liquid cooling system 64 to effectively reduce the temperature of other aspects of the stator 84 of the electric machine 62, such as the first end 94 and second end 96 of stator 84, such as for example, portions of the windings 100 located at the first end 94 and the second end 96 of the stator 84. Accordingly, for the embodiment depicted, the cooling air system 68 provided may assist with cooling of one or more of such portions of the electric machine 62.

As with the embodiment described above, the exemplary cooling air system 68 of the engine 10 depicted in FIG. 2 includes one or more cooling ducts 70 for providing a flow of cooling fluid towards the electric machine 62 during operation of the engine 10. The one or more ducts 70 may more specifically provide for a flow of cooling air 102 towards the electric machine 62 during operation of the engine 10. For example, in certain exemplary aspects, the one or more cooling ducts 70 may receive a flow of cooling air 102 from a compressor section of the engine 10 as a bleed airflow from the compressor section of the engine 10. For example, the bleed airflow may be provided from a low pressure compressor, from a high pressure compressor, and/or from a location between the low pressure compressor and high pressure compressor. Alternatively, the flow of cooling air 102 in the ducts 70 may be provided from, e.g., an ambient location, a location over a cowl 48 of the engine 10, etc.

Referring still to FIG. 2, the one or more cooling ducts 70 of the cooling air system 68 generally provide a flow of cooling air 102 to cool various portions of electric machine 62. Specifically, for the exemplary embodiment depicted, the one or cooling ducts 70 of the cooling air system 68 define a first cooling air flowpath 104 extending to a first end of the electric machine 62 (e.g., ends 90, 94) and a second cooling air flowpath 106 extending to the second end of the electric machine 62 (e.g., ends 92, 96). The first cooling air flowpath 104 and second cooling air flowpath 106 split at a junction 108 within the one or more ducts 70. It will be appreciated that the one or more ducts 70 may include one duct 70 or a plurality of ducts 70 located along the circumferential direction. In such a manner, the junction 108 may be a single junction, or there may be multiple junctions 108 at various locations along the circumferential direction.

The first cooling air flowpath 104 travels through a first opening 110 defined within the one or more ducts 70 to a plenum 112 defined at least in part by the rotating rotor mount 86 extending between the engine shaft 80 in the rotor 82 and the static structure including the ducts 70. The first cooling air flowpath 104 further travels through one or more openings 114 within the rotor mount 86 to a cooling manifold 116 that is rotatable with the rotor 82 and positioned at the first end 90 of the rotor 82. The cooling manifold 116 is configured to receive a flow of cooling fluid, and more specifically is configured to provide such cooling fluid to the stator 84 during operation of the engine 10. More specifically, still, for the embodiment shown, the flow of cooling fluid is a flow of cooling air 102 provided along the first cooling air flowpath 104.

Briefly, it will further be appreciated that the second cooling air flowpath 106 travels from the junction 108 to a stationary manifold 117 located at the second end 92 of the rotor 82, at a location inward of the second end 96 of the stator 84. The stationary manifold 117 may extend in the circumferential direction, having a substantially annular chamber 119. A flow control feature 176 may be included at, e.g., a location upstream of the stationary manifold 117 to control an amount of airflow 102 to the annular chamber 119. The flow control feature 176 may be, e.g., a baffle plate or slot to drive the flow into the annular chamber 119 to enhance a heat transfer coefficient in the chamber 119 to provide additional cooling to a fluid seal component 144 (described below). The flow control feature 176 could be sized to provide deterministic heat transfer cooling for the fluid seal, prior to delivering the flow through the stationary manifold 117 into the upper cavity. The stationary manifold 117 defines one or more second openings 118 oriented towards the second end 96 of the stator 84 of the electric machine 62. In such a manner, the flow of cooling air 102 through the second cooling air flowpath 106 may be provided onto the second end 96 of the stator 84, or more specifically onto a portion of the windings 100 of the stator 84 positioned at the second end 96 of stator 84. The second air flowpath 106 further extends through the air gap 88 of the electric machine 62 defined between the rotor 82 and the stator 84, such that the flow of cooling air 102 through the second air flowpath 106 may further provide cooling to the electric machine 62 along the air gap 88.

Referring still FIG. 2, and now back to the cooling manifold 116, it will be appreciated that the cooling manifold 116 is, for the embodiment shown, coupled to the first end 90 of the rotor 82 of the electric machine 62, to the rotor mount 86 coupling the rotor 82 of the electric machine 62 to the engine shaft 80, or both. For the embodiment shown, the cooling manifold 116 is coupled to both the rotor 82 and the rotor mount 86. However, in other embodiments, the cooling manifold 116 may be coupled to only the rotor 82 or only the rotor mount 86.

Figure 3:
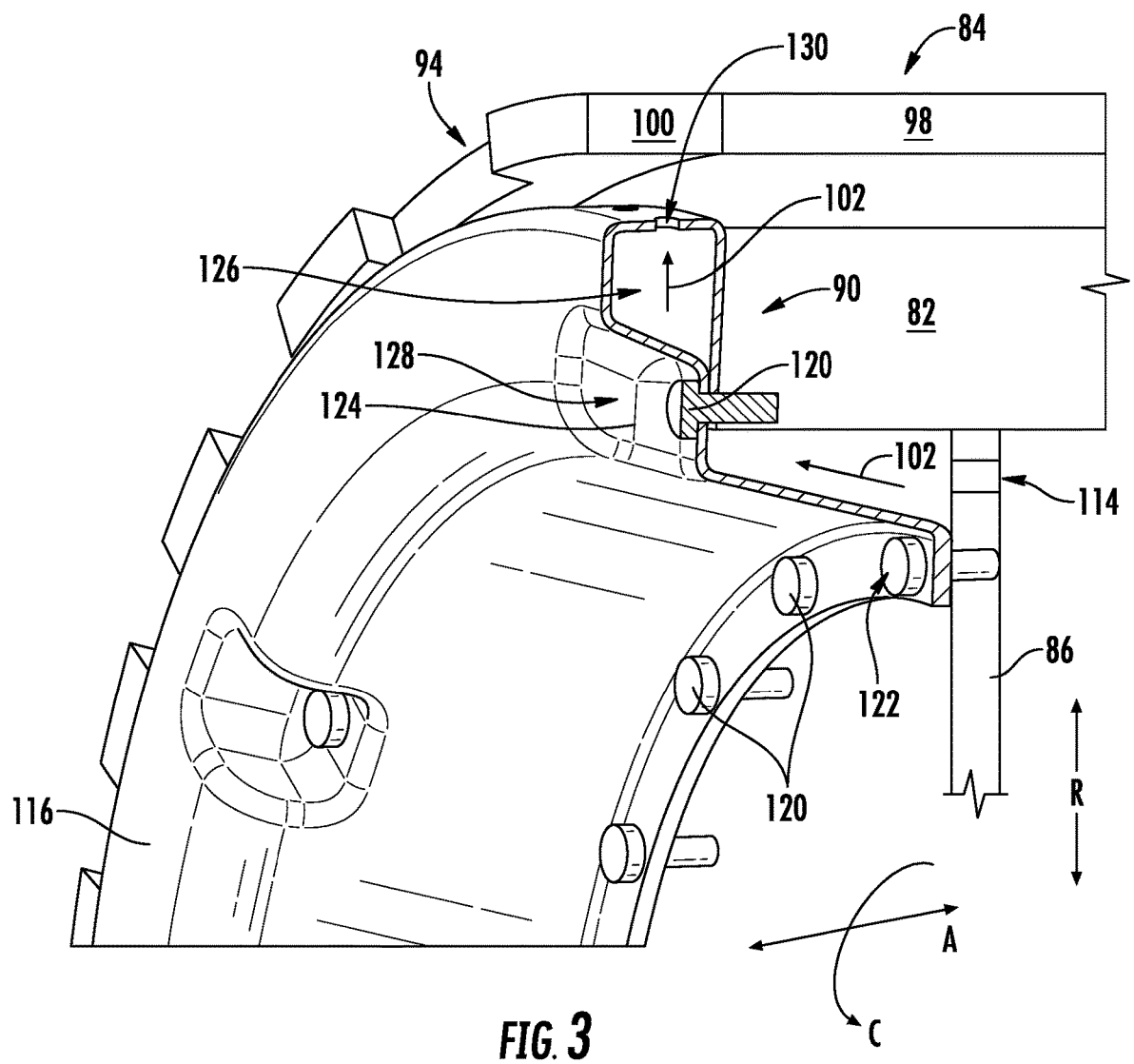
FIG. 3 is a perspective view of a cooling manifold in accordance with an exemplary aspect of the present disclosure.

More specifically, referring now to FIG. 3, a prospective, cross-sectional view of the cooling manifold 116 and a portion of the electric machine 62 of FIG. 2 is provided. As will be appreciated from the view of FIG. 3, the cooling manifold 116 is, for any embodiment shown, coupled to the rotor mount 86 and rotor 82 using a plurality of fasteners 120 spaced along a circumferential direction C of the engine 10. More specifically, still, for the embodiment shown, the cooling manifold 116 is coupled to the rotor mount 86 at a first position 122 along the radial direction R and a second position 124 along the radial direction R using a plurality of fasteners 120, the plurality of fasteners 120 spaced along the circumferential direction C at each of the first and second positions 122, 124 along the radial direction R. Although for the embodiment depicted the cooling manifold 116 is not coupled directly to the rotor 82 of the electric machine 62, it will be appreciated that the cooling manifold 116 is positioned adjacent to the first end 90 of the rotor 82 of the electric machine 62, and in the embodiment shown, is directly contacting the rotor 82 of the electric machine 62. Moreover, as will be further appreciated from the discussion hereinbelow, the cooling manifold 116 is located inward of the second end 94 of the stator 84 along the radial direction R (at the same location or overlapping locations along the axial direction A).

Figure 4:
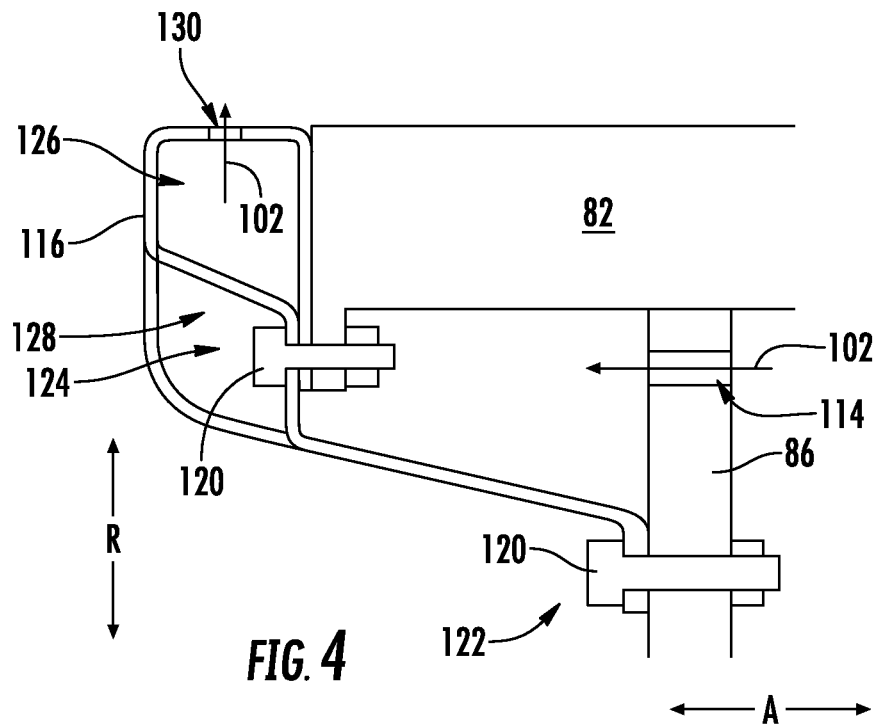
FIG. 4 is a first cross-sectional view of the exemplary cooling manifold of FIG. 3.
Figure 5:
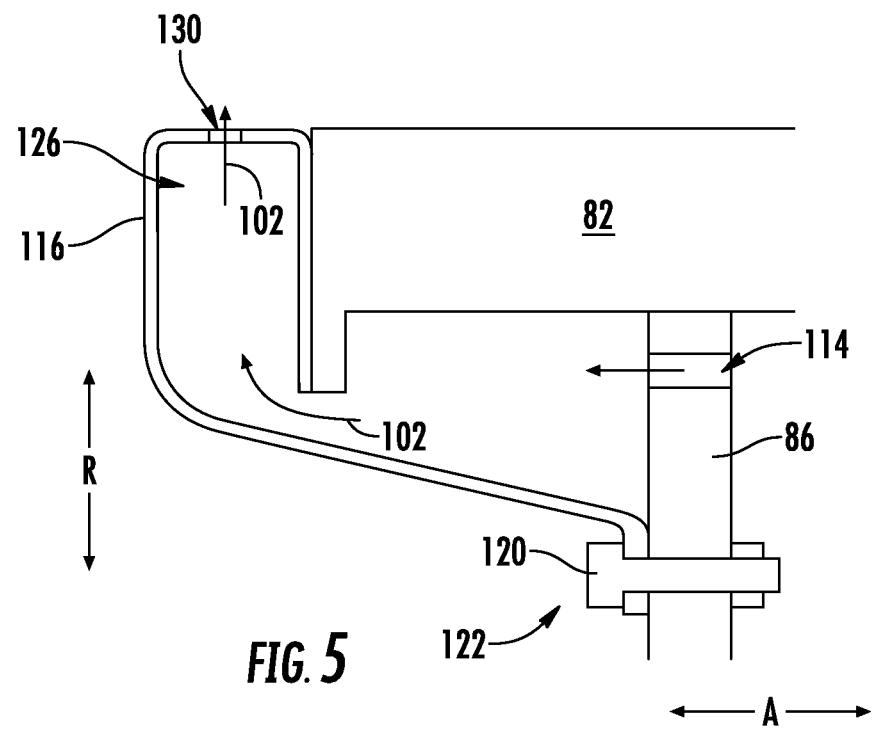
FIG. 5 is a second cross-sectional view of the exemplary cooling manifold of FIG. 3.

As will also be appreciated from the view of FIG. 3, the cooling manifold 116 is configured as a substantially annular manifold defining a substantially annular airflow chamber 126 configured to receive the flow of cooling air 102 from the first air flowpath 104 of the cooling air system 68. Referring briefly to the cross-sectional, schematic views of FIGS. 4 and 5, it will be appreciated that the cooling manifold 116 defines a plurality of embossments 128 extending inwardly along the axial direction A to allow for the cooling manifold 116 to be coupled to the rotor 82 at the second location 124 along the radial direction R using the plurality of fasteners 120. More specifically, FIG. 4 shows a cross-sectional view of the cooling manifold 116 at one of these embossments 128, and FIG. 5 provides a cross-sectional view of the cooling manifold 116 at a different circumferential location, between embossments 128. As shown in FIG. 5, the cooling manifold 116 defines a clear flowpath between the openings 114 in the rotor mount 86 and the substantially annular airflow chamber 126 of the cooling manifold 116 despite the embossments 128.

Referring still generally to FIGS. 3 through 5, it will be appreciated that the cooling manifold 116 further defines one or more impingement openings 130 oriented outwardly along the radial direction R. More specifically, the cooling manifold 116 defines one or more impingement openings 130 oriented towards the stator 84 for providing the flow of cooling air 102 received by the cooling manifold 116 and within the substantially annular airflow chamber 126 onto the stator 84. The one or more impingement openings 130 may include a plurality of impingement openings 130 spaced along the circumferential direction C of the engine 10. Alternatively the one or more impingement openings 130 may include a continuous or substantially continuous impingement opening 130 extending along the circumferential direction C.

Referring particularly to FIG. 3, it will be appreciated that for the embodiment shown, the one or more impingement openings 130 of the cooling manifold 116 are oriented towards the first end 94 of the stator 84 for providing the flow of cooling air 102 received by the cooling manifold 116 and within the substantially annular airflow chamber 126 onto first end 94 of the stator 84. More specifically, for the embodiment depicted, the one or more impingement openings 130 of the cooling manifold 116 are oriented towards at least a portion of the plurality of windings 100 of the stator 84, located at the first end 94 of the stator 84 for providing the flow of cooling air 102 received by the cooling manifold 116 and within the substantially annular airflow chamber 126 onto the portion of the plurality of windings 100 located at the first end 94 of the stator 84.

It will be appreciated, however, that in other exemplary embodiments of the present disclosure, the cooling air system 68 may have any other suitable configuration. For example, the cooling air manifold 116 may have any other suitable configuration. For example, manifold 116 may define one or more impingement openings 130 oriented outwardly along the radial direction R in any other suitable manner, such as not directly along the radial direction R.

Figure 6:
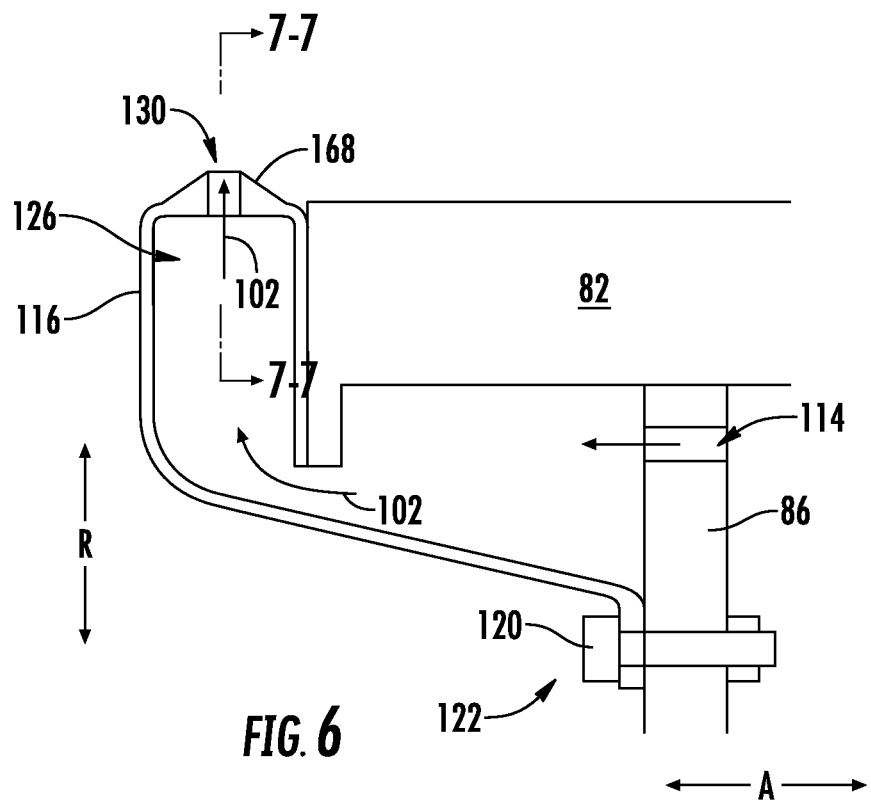
FIG. 6 is a cross-sectional view of a cooling manifold in accordance with an exemplary aspect of the present disclosure.

Referring now briefly to FIG. 6, a cooling manifold 116 in accordance with another exemplary embodiment of the present disclosure is provided. The exemplary cooling manifold 116 depicted includes a local thickness 168 that defines one or more impingement openings 130. Inclusion of the local thickness 168 (which may have a maximum thickness at least two times as thick as a surrounding portion of the cooling manifold 116 and up to 100 times as thick as the surrounding portion of the cooling manifold 116) may allow for the impingement opening(s) 130 to direct the cooling air 102 in a more precise manner.

Figure 7:
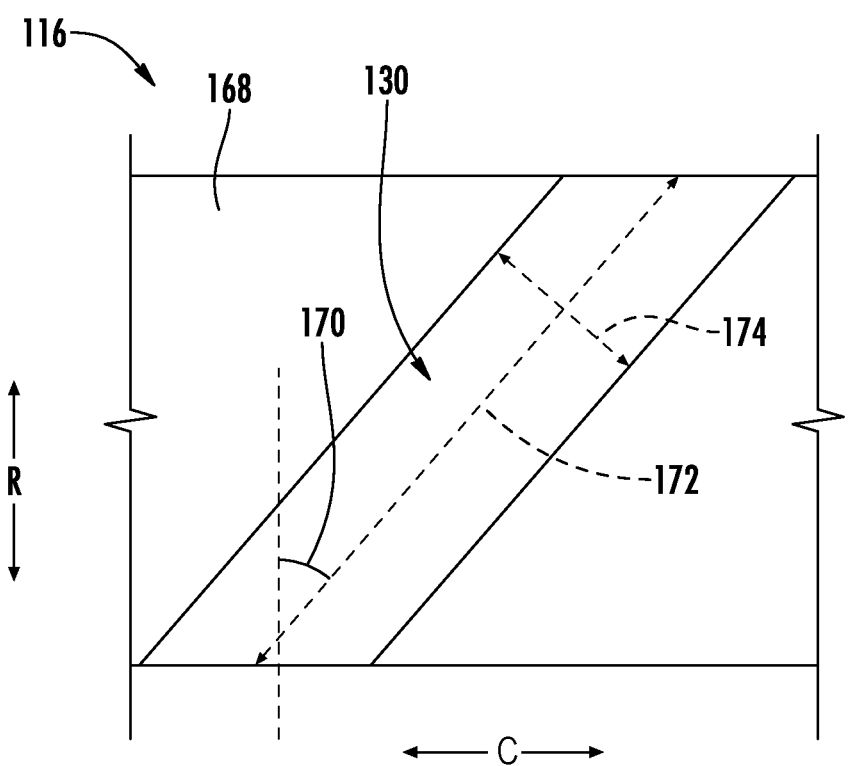
FIG. 7 is a cross-sectional view of the exemplary cooling manifold of FIG. 6 along Line 7-7.

For example, referring now to FIG. 7, providing a schematic, cross-sectional view of an impingement opening(s) 130 in FIG. 6, along Line 7-7 in FIG. 6, it will be appreciated that in certain exemplary aspects, the impingement opening(s) 130 may be oriented towards the stator 84, at an angle 170 relative to a radial direction R to impart a circumferential velocity to the cooling air 102 through the impingement opening(s) 130. The angle 170 may be between 5 degrees and 85 degrees, such as at least 15 degrees, such as at least 30 degrees, such as at least 45 degrees, such as at least 60 degrees, such at least 70 degrees, such as up to 80 degrees. Further, it will be appreciated that the exemplary impingement opening 130 depicted in FIG. 7 defines a length 172 and a diameter 174 (or maximum width for non-circular openings). A ratio of the length 172 to diameter 174 may be greater than 1:1 and less than 4:1, such as less than 3:1, such as less than 2:1. Such a configuration may allow for more effective cooling of the stator 84, despite a rotation of the rotor 82.

Inclusion of a cooling manifold 116 in accordance with one or more these exemplary embodiments may allow for the cooling air system 68 of the engine 10 to provide a desired amount of cooling for the portions of the plurality of windings 100 positioned at the first end 94 of the stator 84.

Referring now back to FIG. 2, it will be appreciated that the exemplary engine 10 depicted in FIG. 2 further includes a fluid seal 132 adjacent to the electric machine 62, and more specifically, adjacent to the second end 92 of the rotor 82 of the electric machine 62. The fluid seal 132 provides a stationary-to-rotating fluid seal 132 between the first cooling air flowpath 104 and the second cooling air flowpath 106, and as such, the fluid seal 132 is in airflow communication with the first cooling air flowpath 104 and the second cooling air flowpath 106. In at least certain exemplary aspects, a pressure of the flow of cooling air 102 through the first cooling air flowpath 104 may be different than the pressure of the flow of cooling air 102 through the second cooling air flowpath 106. In such a manner, the fluid seal 132 may prevent or minimize leakage of airflow between the first cooling air flowpath 104 and the second cooling air flowpath 106.

Figure 8:
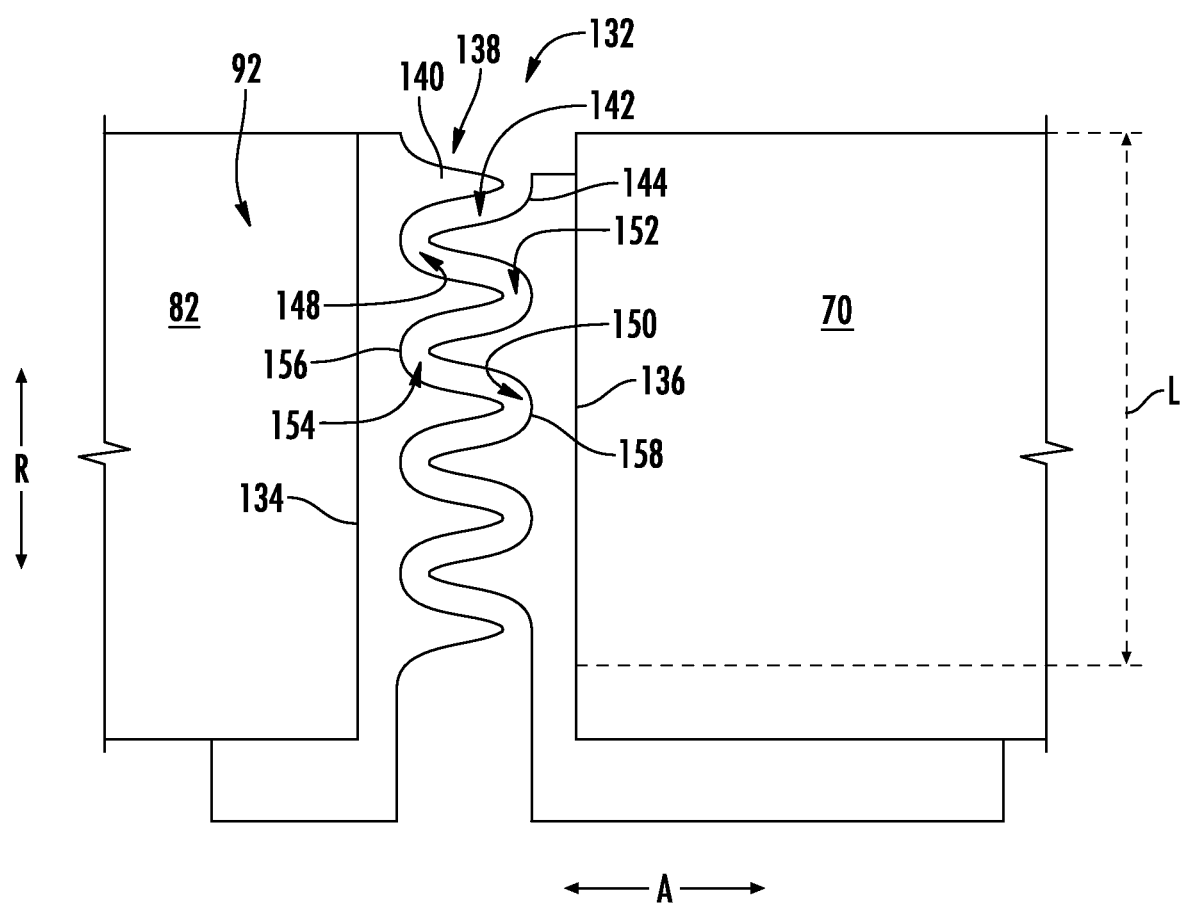
FIG. 8 is a schematic view of a seal in accordance with an exemplary embodiment of the present disclosure.

Referring now also to FIG. 8, a close up, cross-sectional view of the fluid seal 132 is provided. As shown, the fluid seal 132 generally includes a first member 134 rotatable with the rotor 82 of the electric machine 62 and a second member 136 coupled to or formed integrally with a static structure, such as a static structure including the one or more ducts 70 of the cooling air system 68 or the circumferential manifold defining the openings 118 (see FIG. 2). The first member 134 generally includes a first set 138 of seal teeth 140 and the second member 136 generally includes a second set 142 of seal teeth 144 the first and second sets 138, 142 of seal teeth 140, 144 are alternatingly spaced along a length L of the fluid seal 132.

More specifically, for the embodiment shown, the first set 138 of seal teeth 140 includes at least three seal teeth 140 and the second set 142 of seal teeth 144 also includes at least three seal teeth 144. More specifically, for the embodiment show, the first set 138 of seal teeth 140 includes five seal teeth 140 and the second set 142 of seal teeth 144 includes four seal teeth 144. As will be appreciated, each seal tooth 140, 144 is generally an annular seal tooth extending 360° the circumferential direction C about the axis 14 of the engine 10 (see FIG. 2). Although for the embodiment shown, the first set 138 of seal teeth 140 includes five seal teeth 140 and the second set 142 of seal teeth 144 includes four seal teeth 140, in other embodiments, the first set 138 of seal teeth 140, the second set 142 of seal teeth 144, or both may have any other suitable number of seal teeth 140 within their respective sets. For example, in another example embodiment, the first set 138 of seal teeth 140, the second set 142 of seal teeth 144, or both may include 1 seal tooth, 2 seal teeth, 3 seal teeth, 4 seal teeth, 5 seal teeth, 6 seal teeth, 7 seal teeth, 8 seal teeth, 9 seal teeth, 10 seal teeth, or up to 30 seal teeth. The first set 138 of seal teeth 140 may include the same number of seal teeth 144 as the second set 142, or alternatively, the first and second sets 138, 142 of seal teeth 140, 144 may have a different number of seal teeth 140.

Further, for the embodiment shown, each of the seal teeth 140 within the first and second sets 138, 142 of seal teeth 140, 144 extend generally in a direction perpendicular to the length L of the fluid seal 132. More specifically, for the embodiment shown, the length L of the fluid seal 132 is generally aligned with, and defined along, the radial direction R of the engine 10. In such a manner, it will be appreciated that the first and second sets 138, 142 of seal teeth 140, 144 generally extend on the axial direction A of the engine 10.

It will be appreciated, however, that in other exemplary embodiments, the fluid seal 132 may be oriented in any other suitable direction (e.g., defining an angle with respect to the radial direction R of the engine 10), and/or the plurality of seal teeth 140 of the first and second sets 138, 142 of seal teeth 140, 144 may not extend directly perpendicularly to the length L of the fluid seal 132.

Referring still to FIG. 8, it will be appreciated that the first member 134 of the fluid seal 132 further defines a first plurality of valleys 148 between adjacent seal teeth 140 of the first set 138 of seal teeth 140, and similarly, the second member 136 defines a second plurality of valleys 150 between adjacent seal teeth 144 of the second set 142 of seal teeth 144. In the embodiment shown, the first set 138 of seal teeth 140 defines gaps 152 with the second plurality of valleys 150 along the axial direction A, and similarly, the second set 142 of seal teeth 144 defines gaps 154 with the first plurality of valleys 148 along the axial direction A. Such a configuration may allow for any natural variances along the axial direction A during operation of the engine 10 between the rotor 82 of the electric machine 62 and the static structure surrounding the rotor 82 of the electric machine 62.

Moreover, in order to further accommodate these natural variances, it will be appreciated that the first member 134 further includes an abradable coating 156 on the first plurality of valleys 148 defined between adjacent seal teeth 140 of the first set 138 of seal teeth 140, and similarly, the second member 136 also includes an abradable coating 158 on the second plurality of valleys 150 defined between adjacent seal teeth 144 of the second set 142 of seal teeth 144. The abradable coatings 156, 158 are positioned on the surface of the valleys 148, 150 to interface with the opposing seal teeth 140, 144. In such a manner, in the event the relative movement between the rotor 82 of the electric machine 62 and the static structure surrounding the rotor 82 of the electric machine 62 exceeds the length of the gaps 152, 154, the respective seal teeth 140 may not cause unnecessary damage to the first member 134, the second member 136, or both, and further may not substantially disrupt operation of, e.g., the electric machine 62.

Notably, although not depicted, it will be appreciated that in at least certain exemplary aspects, the sides of the teeth 140, 144 may also include an abradable coating to accommodate relative movement, e.g., along the radial direction R.

Referring again to FIG. 2, it will be appreciated that in certain exemplary embodiments, the flow of cooling air 102 from the cooling air system 68 may additionally provide further benefits and serve additional functions for the engine 10. For example, for the embodiment shown, the cooling air system 68 further defines a third cooling air flowpath 160 branching off from the first cooling air flowpath 104 to provide flow of cooling air 102/pressurized air to a sump. More specifically, the engine 10 defines a bearing sump 162 enclosing a bearing 164 that supports rotation of the engine shaft 80. Further, the engine 10 includes a seal 166 (which is represented schematically, and may be, e.g., a labyrinth seal) that defines at least in part the bearing sump 162 surrounding the bearing 164. A flow of cooling air 102 through the third cooling air flowpath 160 may pressurize the bearing sump 162 by providing pressurized air to the seal 166, and may also provide a measure of cooling through any of the cooling 102 provided to the bearing sump 162.

Further, as is depicted schematically in FIG. 2, the flow of cooling air 102 from the first cooling air flowpath 104, the second cooling air flowpath 106, and/or the third cooling air flowpath 160 (or at least a portion of the flow of cooling air 102 from the third cooling air flowpath 160) after imparting a measure of cooling may be provided to an engine flowpath 54 of the engine 10. For example, the flow of cooling air 102 through the first cooling air flowpath 104 and the second cooling air flowpath 106 may be provided to the engine flowpath 54 after having been provided to/impinged upon the stator 84 of electric machine 62. For example, in the embodiment shown, the flow of cooling air 102 is provided to the engine flowpath 54 at a location upstream of a compressor of the engine 10 (see also, e.g., FIG. 1), and more specifically, at a location upstream of an inlet guide vane 74 of the engine 10. In particular, for the embodiment shown, the flow of cooling air 102 is provided to the engine flowpath 54 at the location where the arrow representing the flow of cooling air (labeled 102) reaches the flowpath 54.

In such a manner, the flow of cooling air 102 provided through the cooling air system 68 may be utilized to reduce a temperature of one or more exemplary aspects of the electric machine 62 and/or other components of the engine 10, and may subsequently be provided to the engine flowpath 54, increasing an amount of energy and the airflow through the engine flowpath 54.

Finally, referring still to FIG. 2, it will be appreciated that at least certain of the components operable with the electric machine 62 and/or in close proximity to the electric machine 62 may be formed of materials configured to reduce a risk of electrical losses being incurred by virtue of such components. For example, in at least certain exemplary embodiments, the cooling manifold 116, the first member 134 of the fluid seal 132, the second member 136 of the fluid seal 132, and/or the circumferential manifold defining the openings 118 may be formed of the material configured to reduce the risk of electrical losses. More specifically, in certain exemplary embodiments, the material may be a material that has a relatively low electrical conductance, such as a plastic material, a composite material, or the like.

Further aspects of the invention are provided by the subject matter of the following clauses:

A gas turbine engine defining a radial direction, an axial direction, and an axis extending along the axial direction of the gas, the gas turbine engine comprising: a shaft configured to rotate about the axis; an electric machine comprising a rotor coupled to and rotatable with the shaft and a stator, the rotor defining an end along the axial direction; and a cooling manifold rotatable with the rotor and positioned at the end of the rotor, the cooling manifold configured to receive a flow of cooling fluid and provide the cooling fluid to the stator during operation of the gas turbine engine.

The engine of one or more of these clauses, wherein the gas turbine engine comprises a rotor assembly, and wherein the shaft is a rotor shaft for driving the unducted rotor assembly.

The engine of one or more of these clauses, wherein the gas turbine engine comprises a compressor, and wherein the cooling fluid is a bleed airflow from the compressor.

The engine of one or more of these clauses, wherein the cooling manifold is coupled to the end of the rotor of the electric machine, and wherein the end of the rotor is optionally positioned at least partially inward of the stator along the radial direction.

The engine of one or more of these clauses, wherein the cooling manifold is coupled to the end of the rotor of the electric machine, to a rotor mount coupling the rotor to the engine shaft, or both.

The engine of one or more of these clauses, wherein the rotor mount defines one or more openings for providing the flow of cooling fluid to the cooling manifold.

The engine of one or more of these clauses, further comprising a rotor mount extending between the shaft and the rotor, and wherein the cooling manifold is coupled to the rotor mount.

The engine of one or more of these clauses, wherein the cooling manifold defines one or more impingement openings oriented towards the stator for providing the cooling fluid as an impingement airflow onto the stator.

The engine of one or more of these clauses, wherein the stator comprises a plurality of windings, and wherein the one or more impingement openings are oriented towards at least a portion of the plurality of windings of the stator for providing the cooling fluid as the impingement airflow onto the plurality of windings of the stator.

The engine of one or more of these clauses, wherein the manifold is a substantially annular manifold.

The engine of one or more of these clauses, further comprising a liquid cooling system, wherein the liquid cooling system is in thermal communication with the electric machine for cooling the electric machine.

The engine of one or more of these clauses, further comprising: a bearing supporting rotation of the shaft, and a seal defining at least in part a bearing sump surrounding the bearing; and a cooling airflow supply, wherein the cooling airflow supply is in airflow communication with the cooling manifold for providing the flow of cooling fluid to the cooling manifold and with the seal for pressurizing the seal.

The engine of one or more of these clauses, wherein the engine is a single unducted rotor engine.

The engine of one or more of these clauses, wherein the engine is one of: a ducted turbofan engine, an unducted turbofan engine, a turboprop engine, a turboshaft engine, or a turbojet engine.

The engine of one or more of these clauses, wherein the gas turbine engine defines an engine flowpath, and wherein the cooling fluid is provided to the engine flowpath after being provided on the stator of the electric machine.

The engine of one or more of these clauses, wherein the gas turbine engine comprises a compressor, and wherein the cooling fluid is provided to the engine flowpath at a location upstream of the compressor after being provided on the stator of the electric machine.

The engine of one or more of these clauses, wherein the gas turbine engine comprises an inlet guide vane, and wherein the cooling fluid is provided to the engine flowpath at a location upstream of the inlet guide vane after being provided on the stator of the electric machine.

A gas turbine engine defining a radial direction, an axial direction, and an axis extending along the axial direction of the gas, the gas turbine engine comprising: a static structure; a shaft configured to rotate about the axis; an electric machine comprising a rotor coupled to and rotatable with the shaft and a stator coupled to the static structure; and a fluid seal, the fluid seal comprising a first member comprising a first set of seal teeth, the first member rotatable with the rotor of the electric machine; and a second member comprising a second set of seal teeth, the second member coupled to, or formed integrally with, the static structure, wherein the first and second sets of seal teeth are alternatingly spaced along a length of the fluid seal.

The engine of one or more of these clauses, wherein the length of the fluid seal is defined along the radial direction of the engine, and wherein the first and second sets of seal teeth extend generally along the axial direction of the engine.

The engine of one or more of these clauses, wherein the first member defines a first plurality of valleys between adjacent seal teeth of the first set of seal teeth, wherein the second member defines a second plurality of valleys between adjacent seal teeth of the second set of seal teeth, wherein the first set of seal teeth define gaps with the second plurality of valleys along the axial direction, and wherein the second set of seal teeth define gaps with the first plurality of valleys along the axial direction.

The engine of one or more of these clauses, wherein the first member defines a plurality of valleys between adjacent seal teeth of the first set of seal teeth, and wherein the plurality of valleys are coated with an abradable material.

The engine of one or more of these clauses, wherein the second member also defines a plurality of valleys between adjacent seal teeth of the second set of seal teeth, and wherein the plurality of valleys of the second member are also coated with an abradable material.

The engine of one or more of these clauses, wherein a seal tooth of the first set of seal teeth, a seal tooth of the second set of seal teeth, or both are coated with an abradable material.

The engine of one or more of these clauses, wherein the first set of seal teeth includes at least one seal tooth, and wherein the second set of seal teeth also includes at least one seal tooth.

The engine of one or more of these clauses, wherein the first set of seal teeth includes at least three rows of seal teeth, and wherein the second set of seal teeth also includes at least three rows of seal teeth.

The engine of one or more of these clauses, wherein the electric machine defines a first end and a second end along the axial direction, wherein the engine comprises a cooling air assembly defining a first cooling air flowpath extending to the first end of the electric machine and a second cooling air flowpath extending to the second end of the electric machine, and wherein the fluid seal is in airflow communication with the first cooling air flowpath and the second cooling air flowpath.

The engine of one or more of these clauses, wherein the fluid seal is configured to block a flow of cooling air from passing between the first and second cooling air flowpaths.

The engine of one or more of these clauses, wherein one of the first member or second member is formed of a non-metallic material.

The engine of one or more of these clauses, wherein the second member is formed of a non-metallic material.

The engine of one or more of these clauses, wherein the engine further includes a stationary manifold at a second end of the rotor of the electric machine, wherein the cooling manifold is formed of a non-metallic material, the stationary manifold is formed of a non-metallic material, or both.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A gas turbine engine defining a radial direction, an axial direction, and an axis extending along the axial direction of the gas, the gas turbine engine comprising:
   a shaft configured to rotate about the axis;
   an electric machine comprising a rotor coupled to and rotatable with the shaft and a stator, the rotor defining an end along the axial direction; and
   a cooling manifold rotatable with the rotor and positioned at the end of the rotor, the cooling manifold configured to receive a flow of cooling fluid and provide the cooling fluid to the stator during operation of the gas turbine engine.

2. The engine of claim 1, wherein the gas turbine engine comprises a rotor assembly, and wherein the shaft is a rotor shaft for driving the unducted rotor assembly.

3. The engine of claim 1, wherein the gas turbine engine comprises a compressor, and wherein the cooling fluid is a bleed airflow from the compressor.

4. The engine of claim 1, wherein the cooling manifold is coupled to the end of the rotor of the electric machine, and wherein the end of the rotor is optionally positioned at least partially inward of the stator along the radial direction.

5. The engine of claim 1, wherein the cooling manifold is coupled to the end of the rotor of the electric machine, to a rotor mount coupling the rotor to the engine shaft, or both.

6. The engine of claim 5, wherein the rotor mount defines one or more openings for providing the flow of cooling fluid to the cooling manifold.

7. The engine of claim 1, further comprising a rotor mount extending between the shaft and the rotor, and wherein the cooling manifold is coupled to the rotor mount.

8. The engine of claim 1, wherein the cooling manifold defines one or more impingement openings oriented towards the stator for providing the cooling fluid as an impingement airflow onto the stator.

9. The engine of claim 8, wherein the stator comprises a plurality of windings, and wherein the one or more impingement openings are oriented towards at least a portion of the plurality of windings of the stator for providing the cooling fluid as the impingement airflow onto the plurality of windings of the stator.

10. The engine of claim 1, wherein the manifold is a substantially annular manifold.

11. The engine of claim 1, further comprising a liquid cooling system, wherein the liquid cooling system is in thermal communication with the electric machine for cooling the electric machine.

12. The engine of claim 1, further comprising:
a bearing supporting rotation of the shaft, and
a seal defining at least in part a bearing sump surrounding the bearing; and
a cooling airflow supply, wherein the cooling airflow supply is in airflow communication with the cooling manifold for providing the flow of cooling fluid to the cooling manifold and with the seal for pressurizing the seal.

13. The engine of claim 1, wherein the engine is a single unducted rotor engine.

14. The engine of claim 1, wherein the engine is one of: a ducted turbofan engine, an unducted turbofan engine, a turboprop engine, a turboshaft engine, or a turbojet engine.

15. The engine of claim 1, wherein the gas turbine engine defines an engine flowpath, and wherein the cooling fluid is provided to the engine flowpath after being provided on the stator of the electric machine.

16. The engine of claim 15, wherein the gas turbine engine comprises a compressor, and wherein the cooling fluid is provided to the engine flowpath at a location upstream of the compressor after being provided on the stator of the electric machine.

17. The engine of claim 15, wherein the gas turbine engine comprises an inlet guide vane, and wherein the cooling fluid is provided to the engine flowpath at a location upstream of the inlet guide vane after being provided on the stator of the electric machine.

18. A gas turbine engine defining a radial direction, an axial direction, and an axis extending along the axial direction of the gas, the gas turbine engine comprising:
a static structure;
a shaft configured to rotate about the axis;
an electric machine comprising a rotor coupled to and rotatable with the shaft and a stator coupled to the static structure; and
a fluid seal, the fluid seal comprising
a first member comprising a first set of seal teeth, the first member rotatable with the rotor of the electric machine; and
a second member comprising a second set of seal teeth, the second member coupled to, or formed integrally with, the static structure, wherein the first and second sets of seal teeth are alternately spaced along a length of the fluid seal.

19. The engine of claim 18, wherein the length of the fluid seal is defined along the radial direction of the engine, and wherein the first and second sets of seal teeth extend generally along the axial direction of the engine.

20. The engine of claim 18, wherein the first member defines a first plurality of valleys between adjacent seal teeth of the first set of seal teeth, wherein the second member defines a second plurality of valleys between adjacent seal teeth of the second set of seal teeth, wherein the first set of seal teeth define gaps with the second plurality of valleys along the axial direction, and wherein the second set of seal teeth define gaps with the first plurality of valleys along the axial direction.

\* \* \* \* \*